(12) United States Patent
Sadan et al.

(10) Patent No.: US 6,398,037 B1
(45) Date of Patent: Jun. 4, 2002

(54) REVERSE FLOW SPIN-CLEANING LIQUID FILTERS

(75) Inventors: Yiftach Sadan; Raanan Ben-Horin, both of Kibbutz Beit-Zera (IL)

(73) Assignee: "AR-KAL" Plastics Products (IL)

( * ) Notice: Subject to any disclaimer, the term of this patent is extended or adjusted under 35 U.S.C. 154(b) by 0 days.

(21) Appl. No.: 09/581,934

(22) PCT Filed: Dec. 15, 1998

(86) PCT No.: PCT/IL98/00606
§ 371 (c)(1),
(2), (4) Date: Nov. 3, 2000

(87) PCT Pub. No.: WO99/30796
PCT Pub. Date: Jun. 24, 1999

(30) Foreign Application Priority Data

Dec. 18, 1997 (IL) .................................................. 122675

(51) Int. Cl.[7] .......................... B01D 29/68; B01D 26/46; B01D 29/74
(52) U.S. Cl. ........................ 210/352; 210/354; 210/356; 210/411; 210/488; 210/136
(58) Field of Search ................................. 210/411, 488, 210/356, 354, 352, 136

(56) References Cited

U.S. PATENT DOCUMENTS

| 3,338,416 A | 8/1967 | Barry |
| 3,511,374 A | 5/1970 | Beal |
| 4,297,209 A | * 10/1981 | DeVisser et al. |
| 4,655,910 A | 4/1987 | Tabor |
| 4,655,911 A | 4/1987 | Tabor |
| 5,152,891 A | 10/1992 | O'Connell et al. |
| 5,192,429 A | * 3/1993 | Bader |

FOREIGN PATENT DOCUMENTS

| EP | 0725040 | 8/1996 |
| GB | 2256599 | * 12/1992 |

* cited by examiner

Primary Examiner—Thomas M. Lithgow
(74) Attorney, Agent, or Firm—Ostrolenk, Faber, Gerb & Soffen, LLP

(57) ABSTRACT

A liquid filtering device having a pack of cylindrical filter member discs (70) with an arrangement for reversed, filter flushing flow cycles. An integrally formed filter core (24) is provided comprising tubular nozzled conduits (30a, 30b, 30c) so that water under pressure within the conduits becomes discharged in jet forms to enable free rotation of the filter discs. One-way valve (90) in the form of a funnel shaped rubber sleeve allows the flow of filtered water to the outlet port (20) but impedes the flow of flushing water from the outlet port through the filter member (70) in the direction of the inlet port (16).

6 Claims, 7 Drawing Sheets

REVERSE FLOW SPIN-CLEANING LIQUID FILTERS

BACKGROUND OF THE INVENTION

The present invention relates to liquid filters, particularly for water irrigation systems, however also useful for other industrial or domestic applications.

More specifically, the invention concerns filter devices of the type disclosed in our U.S. Pat. No. 4,655,910 issued Apr. 7, 1987, the contents of which is hereby incorporated by reference (hereinafter called "the Patent").

The Patent has introduced for the first time the concept of using filter devices—in particular of the type utilizing a battery of filter discs—with reverse flushing water flow cycles wherein the discs were caused to spin under the impact of water jets impinging thereon (hereinafter referred to as "Spin-Clean Filters").

The various constructional examples disclosed in the Patent had in common a centrally extending conduit serving the dual function of leading the flushing water to a series of nozzles provided thereon, and of supporting the spinning movement of the discs.

This feature of construction presented, however, certain disadvantages: the operation of the hydraulic cylinder system, responsible for relieving the pack of discs from the compact, filtering position, was mainly dependent upon the level of back-pressure applied by the reverse water flow, dictated, among others, by a relatively large diameter piston; rather cumbersome valve means had to be used for directing the reverse flow of water into the nozzled conduit; and generally—an excessive number of parts and components had to be used, causing respective increase of the manufacture, assembly and maintenance costs of the product.

It is thus the general object of the present invention to overcome the above-listed deficiencies of the conventional spin-clean filters.

It is a further object of the invention to simplify the design of the spin-clean filters, by providing a core member of the filter device of a unitary and integral construction, readily produced by plastics injection molding process, that will effectively serve the combined functions of:

- generating the water jets;
- supporting the revolving movement of the filter discs (or integral filter member of different types such as screen filters);
- providing convenient access to the hydraulic piston assembly by external pressure control means;
- forming a seat for a simple, elastic sleeve-type valve member responsive to the oppositely directed water flows during the filtering and the flushing modes of operation, respectively; and
- providing a centrally extending tube through which pressure commands are admitted for the operation of the hydraulic piston, controlling the disengagement of the filter discs.

It is a still further object of the invention to provide a filter device with one or more jets generating conduits which extend off-centrally relatively to the axis of the filter member, along and adjacent to a generatrix line thereof.

It is a still further object of the present invention to provide a ribbed structure for supporting the spinning motion of the filter element(s) independently of jet generating conduit(s).

SUMMARY OF THE INVENTION

It is therefore proposed according to the present invention to provide a liquid filtering device, particularly for irrigation water installations of the type comprising a cylindrical housing with an inlet port and an outlet port and a cylindrical filter member installed within the housing so that water flowing from the inlet to the outlet enters the filter member in a radial direction, and discharged through the outlet port, and vice-versa during a reversed, filter flushing flow cycles, the device comprising a filter core member centrally mounted within the cylindrical space defined by the filter member, the core member comprising at least one tubular conduit extending within, adjacent to, and along a generatrix line of the filter member, the conduit being closed at one end and in free communication with the outlet port through its other end; a series of nozzles associated with the conduit so that water under pressure within the conduit becomes discharged in jet forms and a filter support structure configured to enable free rotation of the filter member therearound; one-way valve means adapted to allow the flow of filtered water from the filter member to the outlet port but to impede the flow of flushing water from the outlet through the filter in the reverse direction; a fixed member at one side, and a displaceable member at the other side of the filter member; means for urging the displaceable member against the filter member to clamp same between the displaceable and the fixed members; hydraulic activating means associated with the displaceable member and external controllable pressure means operatively coupled to the displaceable member, the arrangement being such that upon a pressure command by the pressure means, the displaceable member is moved away from the filter member to relieve the clamping engagement thereof, and upon application of the filter flushing flow the water jets are sprayed to rinse the filter member.

According to a preferred embodiment of the invention, the filter core member is integrally formed by plastics injection molding process.

BRIEF DESCRIPTION OF THE DRAWINGS

These and additional constructional features and advantages of the present invention will become more clearly understood in light of the ensuing description of a preferred embodiment thereof, given by way of example only, with reference to the accompanying drawings, wherein.

DETAILED DESCRIPTION OF THE PREFERRED EMBODIMENTS

Figure 1:
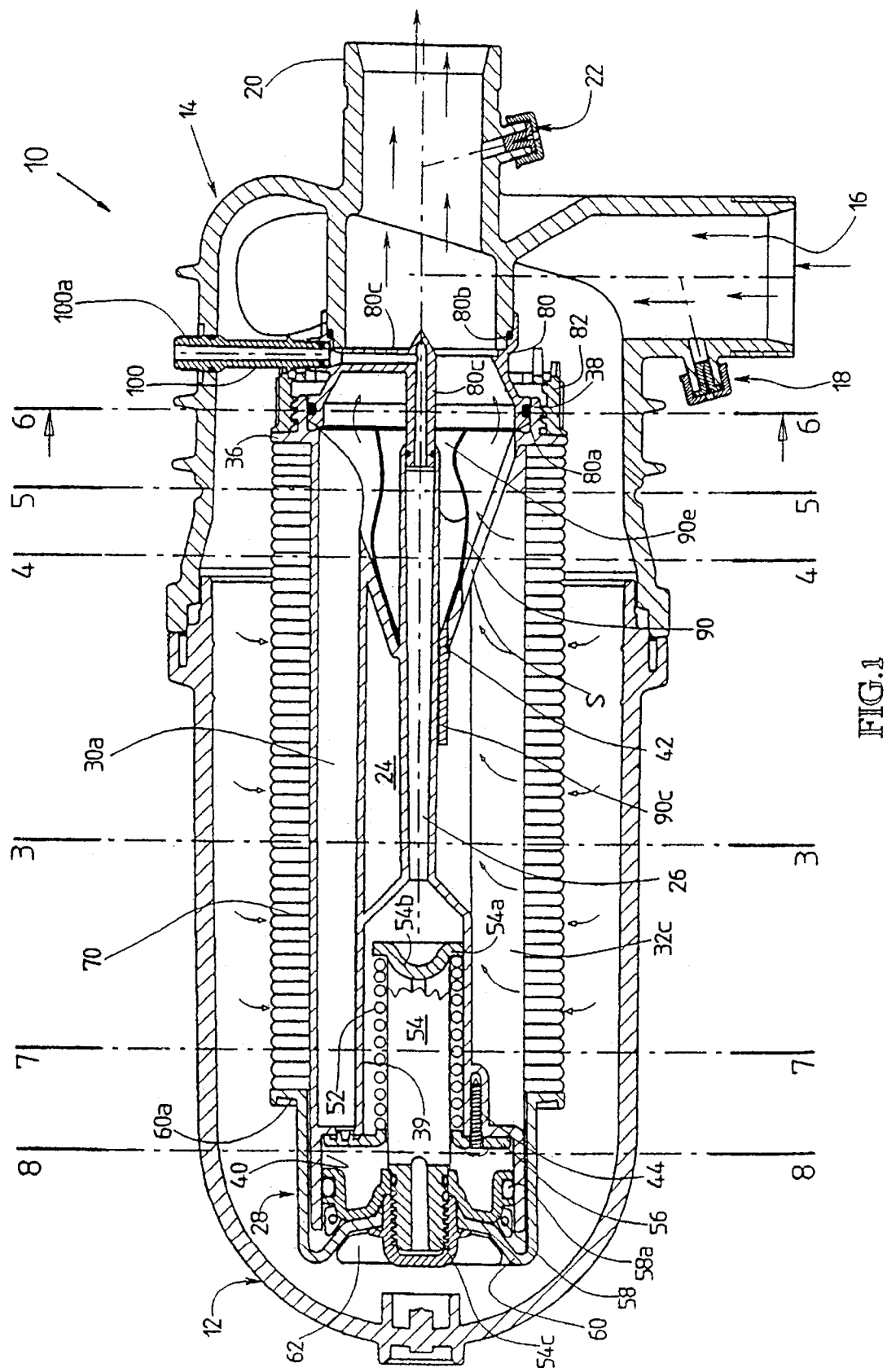
FIG. 1 is a longitudinal cross-sectional view of a filter device according to a preferred embodiment of the invention shown in the normal, filtering mode of operation.

With reference to FIG. 1, the filter device generally designated 10 comprises a two-member housing, namely, the first dome-shaped cover member 12 and second inlet/outlet ports member 14.

The housing members are mounted to each other in any conventional manner such as tightening bands or the like (not shown). The second housing member 14 comprises inlet port 16, preferably with a first pressure gauge nipple 18 for measuring inlet pressure conditions; and outlet port 20 with a second pressure gauge nipple 22.

The integral main filter core member generally denoted 24 (see FIG. 2) comprises the following sub-structure components: a centrally extending, pressure commands communication tube 26, which leads to hydraulic piston system assembly, generally denoted 28, as will be described below; an array of three, off-centrally located flushing nozzled conduits 30*a*, 30*b* and 30*c* (see FIG. 3) each provided with a plurality of jet-forming nozzles denoted N; a structure comprised of three filter-supporting vanes 32*a*, 32*b*, 32*c*; a cone-shaped valve-seat cavity walls 34 (see FIG. 2) with a plurality of filtered water discharge slits S deployed around an intermediate wall portion thereof; a fixed element backing flange 36, combined with mounting screw-threaded ring 38; a first cylindrical cavity 39; and a second, concentrical, cavity 40, the latter forming the piston cylinder 40 for hydraulic or pneumatic piston 58, as will be explained below.

Further notice should be taken of three passages 42 (only one seen in FIGS. 1 and 2) and three or more screw-receiving bores 44—the major point being that the core member 24, including all the above-detailed parts and components, can readily be manufactured, as a one-piece, solid article, by state-of-the-art plastics injection molding process.

Figure 2:
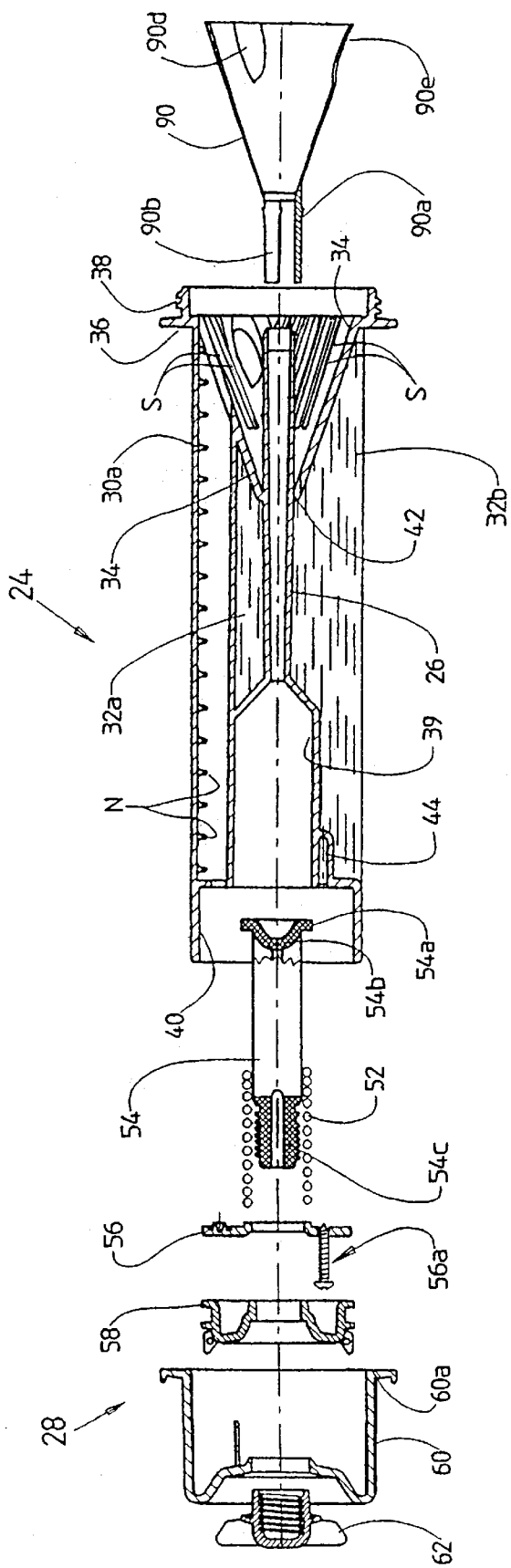
FIG. 2 is an exploded cross-sectional view of the filter assembly of FIG. 1.
Figure 3:
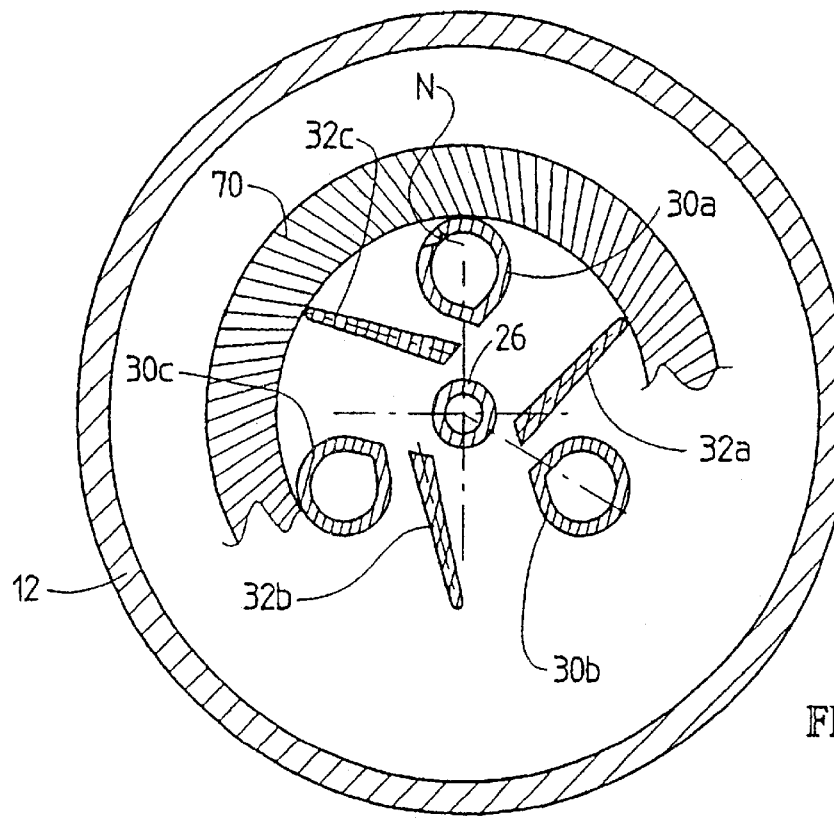
FIG. 3 is a section taken along line 3—3 of FIG. 1.
Figure 4:
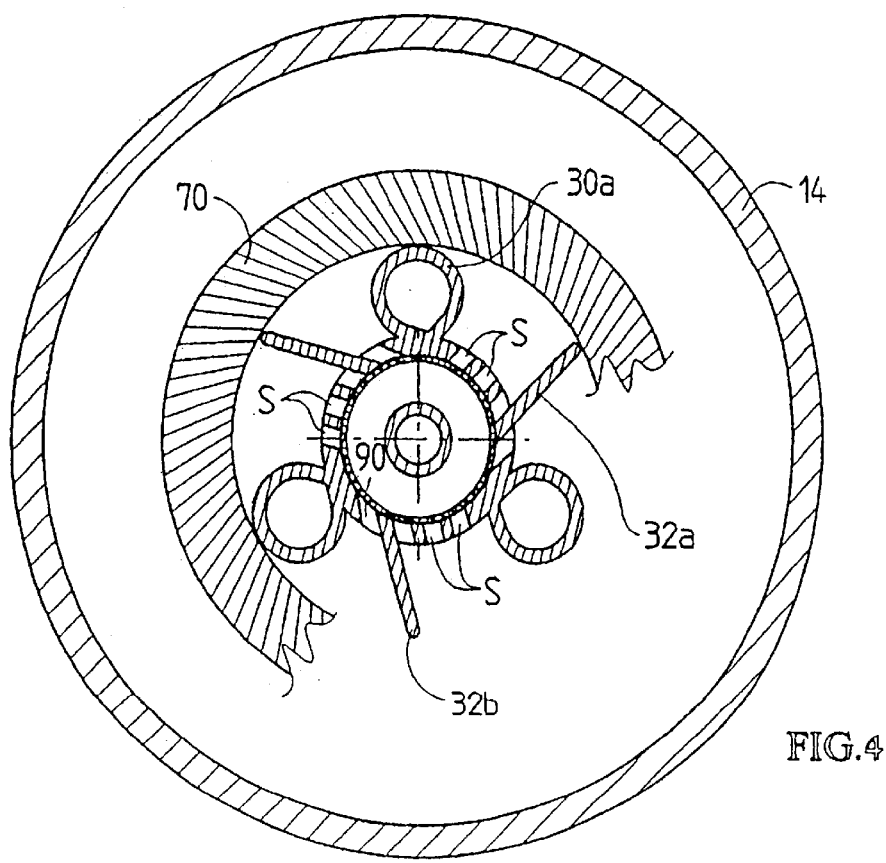
FIG. 4 is a section taken along line 4—4 of FIG. 1.
Figure 5:
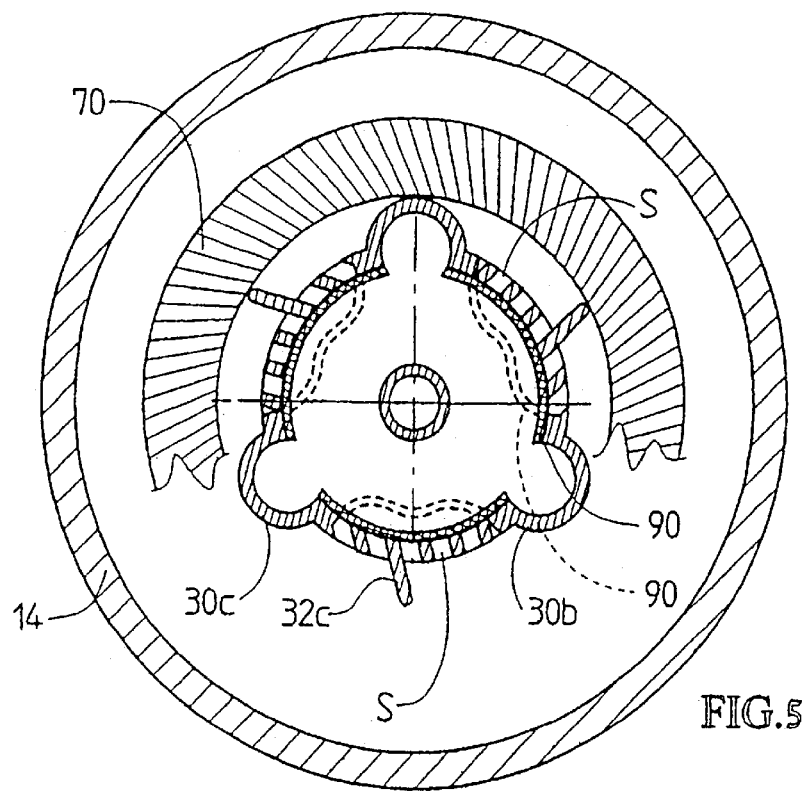
FIG. 5 is a section taken along line 5—5 of FIG. 1.
Figure 7:
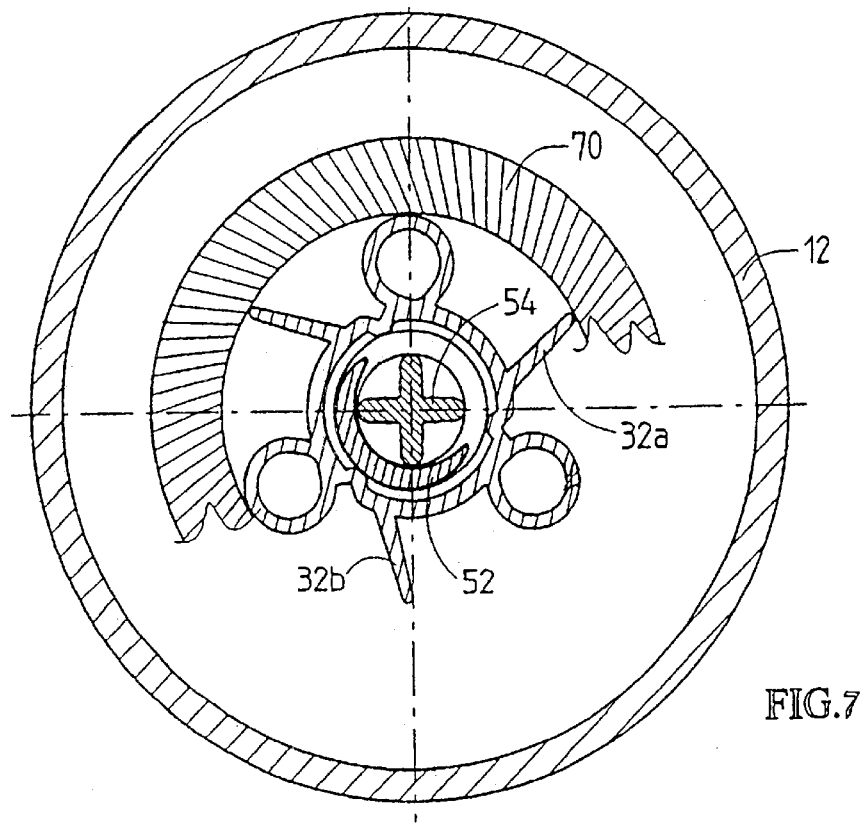
FIG. 7 is a section taken along line 7—7 of FIG. 1.
Figure 8:
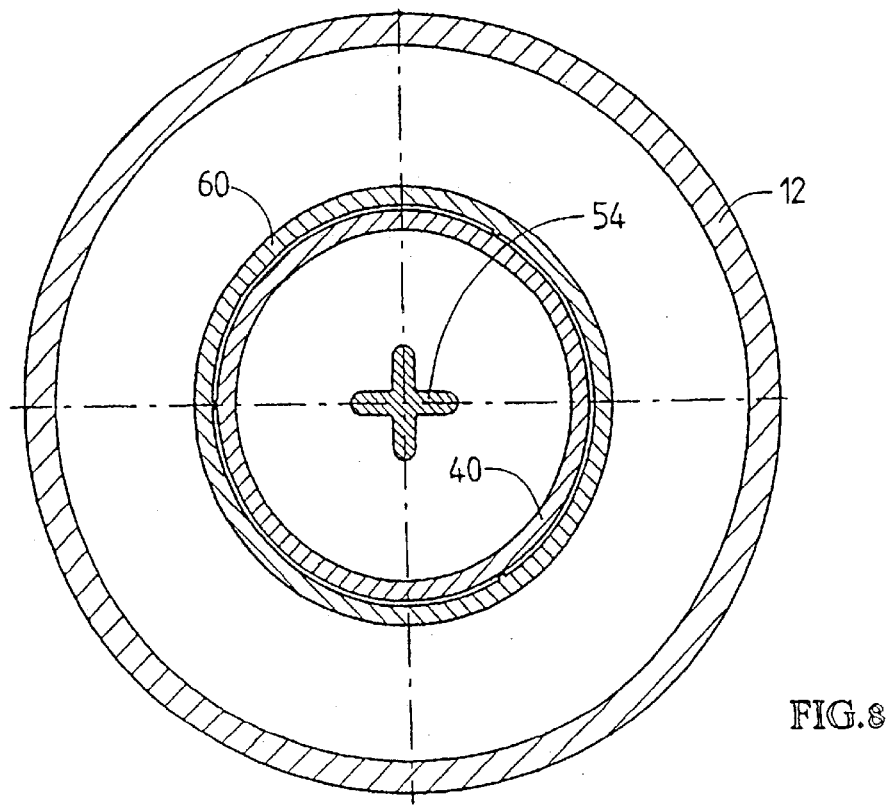
FIG. 8 is a section taken along line 8—8 of FIG. 1.

Reference shall now be made to the hydraulic (or pneumatic) cylinder and piston system assembly 28, seen in FIG. 1, and more clearly in FIGS. 2, 7 and 8. In the present example, it comprises a coil spring 52, compressed between rim 54*a* of perforated base 54*b* of cross-shaped rod 54 (so that water can uninterruptedly flow therealong), and disc 56 fastened by self-tapping screws 56*a* driven into the pre-formed screw receiving bores 44.

Piston 58 with sealing gasket 58*a* (see FIG. 1) is slidable within the second concentrical cavity, which formed the piston cylinder denoted 40. A cap member 60 is dressed over the piston cylinder 40, tightened to the piston 58 by butterfly nut 62 fastened to bolt thread portion 54*c* of the cross-shaped rod 54.

The cap member 60 possesses a cap flange 60*a*, forming the counter-part of the fixed element backing flange 36, and comprises the displaceable hydraulic piston system assembly 28, achieving the relief of the clamping of filter discs battery generally denoted 70.

Referring back to the leading end of the integral main filter core member 24 (FIGS. 1, 2 and 6), it is seen that the mounting screw-threaded ring 36 is coupled to an intermediate mounting fitting 80 via ring 82 (with O-rings 80*a* and 80*b*), and is thus mounted to and forms an extension of the outlet port 20.

Figure 9:
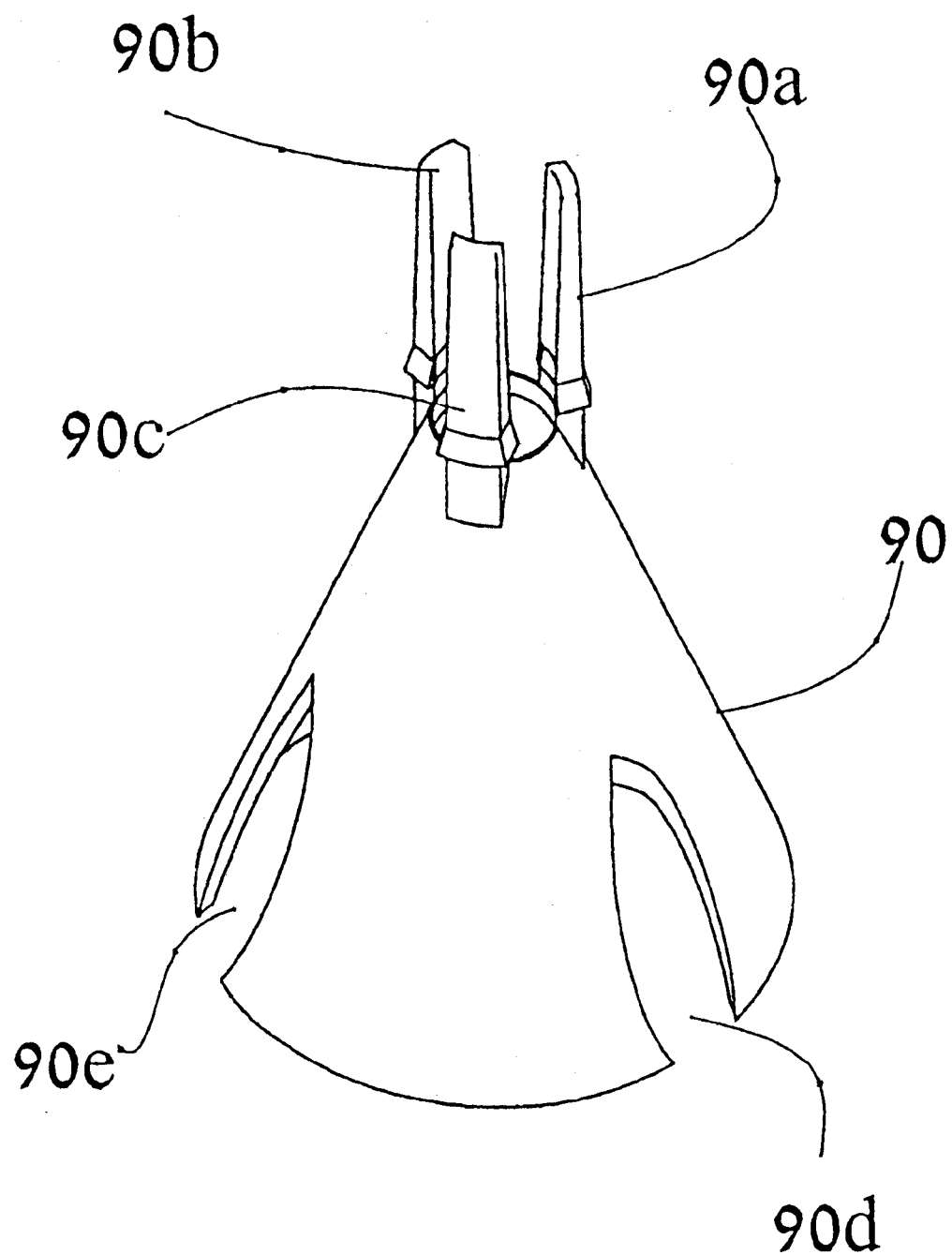
FIG. 9 is a perspective view of a rubber sleeve one-way valve employed in the filter of FIG. 1.

In-between, a funnel-shaped sleeve, serving as one-way valve 90 is provided, fitting into the cone-shaped valve-seat cavity walls 34, (see FIG. 2)—having three mounting legs 90*a*, 90*b* and 90*c* (see FIG. 9). Three cut-out portions 90*d*, 90*e* and 90*f* (not shown) are made, so that in the assembled position the openings of the tubes 30*a*,30*b* and 30*c* will remain open, while the outlet slits S of cone-shaped valve-seat: cavity walls 34 are elastically sealed.

Mounting of the funnel-shaped valve 90 is conveniently attained by insertion of the legs 90*a*–90*c* through the passages 42 left for that purpose during the molding of the integral main filter core member 24.

The rubber funnel-shaped valve 90 is preferably made of Latex rubber or equivalent synthetic elastic material.

Figure 6:
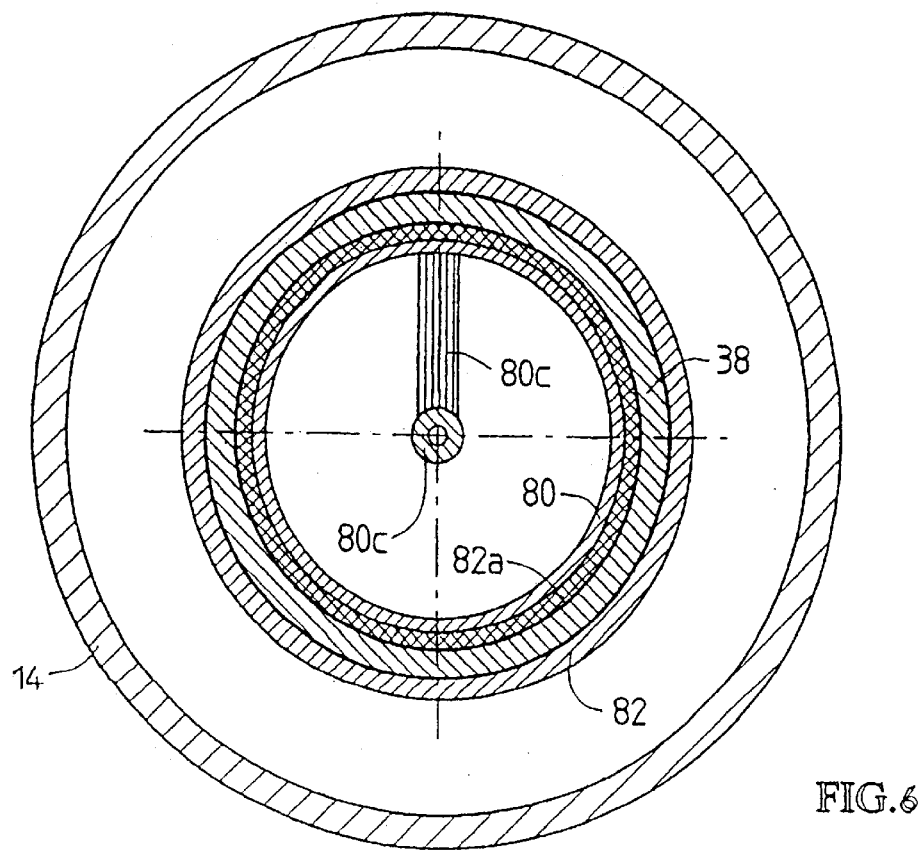
FIG. 6 is a sectional view taken along line 6—6 of FIG. 1.

Finally, the pressure control commands leading tube 26 is extended as by an L-shaped tubular member 80*c*, preferably integrally molded with the intermediate mounting fitting 80 (see FIG. 6). Communication to the pressurized fluid (hydraulic or pneumatic) source (not shown) is then completed by extension tube 100 with nipple 100*a* projecting from the wall of the housing inlet-outlet ports member 14.

Figure 10:
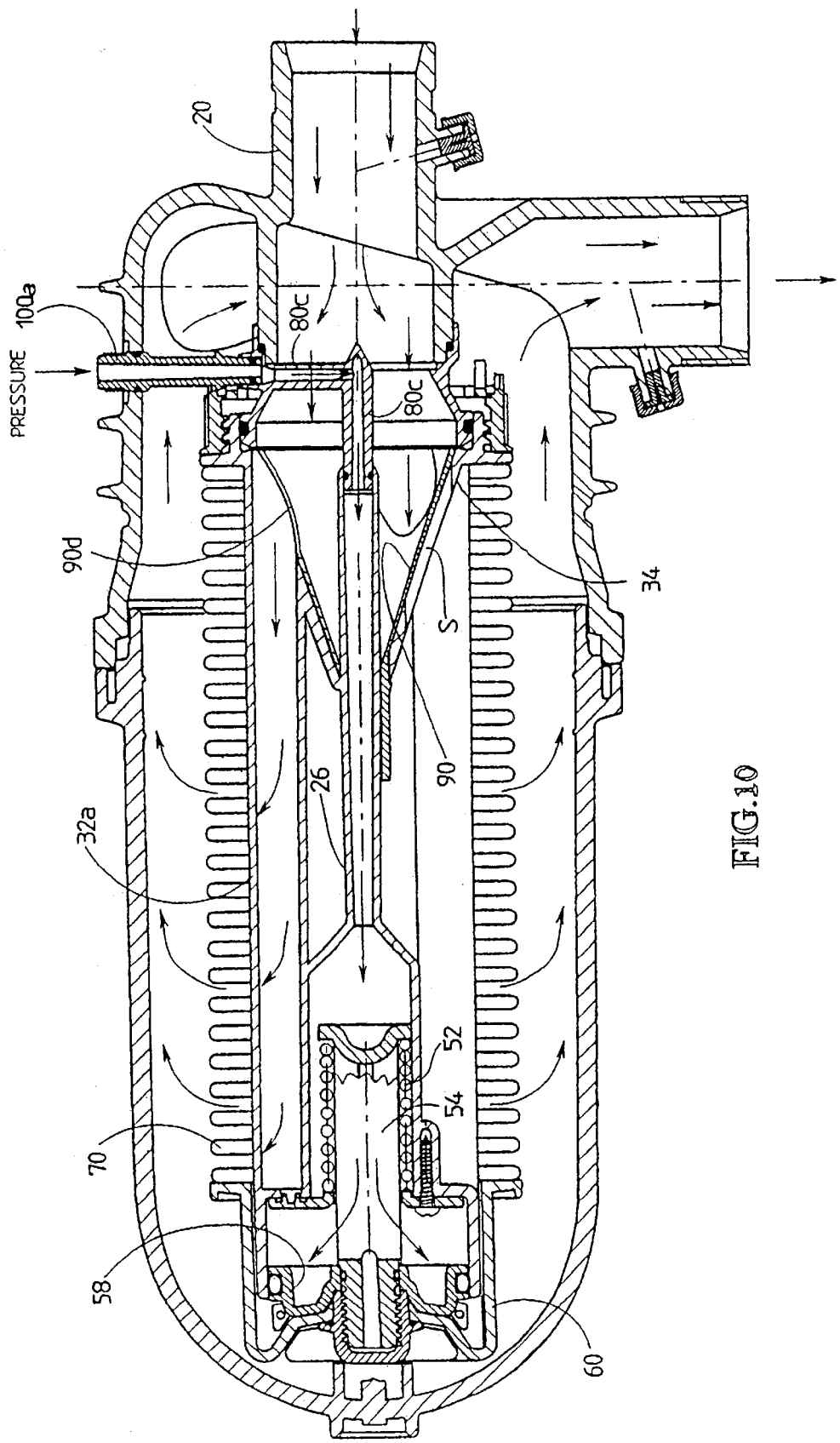
FIG. 10 shows the filter device of FIG. 1 in the reverse flush flow, spin-cleaning mode of operation.

The operation of the filter device 10 will be now described with reference to FIGS. 1 and 10. Water to be filtered is admitted through the inlet port 16, surrounds the integral main filter core member 24 with filter discs battery 70, penetrates through said filter discs battery 70, pushes its way through the slits S by deforming inwardly the one-way funnel-shaped sleeve valva 90, and becomes discharged through the outlet 20.

It should be noticed, that at this, normal filtering operational stage, the pressure prevailing within the filter is the outlet pressure, namely close to the atmospheric; and that no pressure command is applied to the piston system 28. Therefore, the force applied by the cap member 60 on the filter discs battery 70 equals to the inlet pressure (usually about 3–5 atm.) multiplied by the (projected) area of the piston 58 plus the force of the compression spring 52.

The flushing cycle proceeds as follows (see FIG. 10). The inlet flow is first interrupted, relieving the piston 58 from the inlet pressure (while the force of the compression spring 52 is still applied). It is the pressure command delivered from the control system (not shown), through the nipple 100*a*, tube 80*c*, tube 26, and around the cross-shaped rod 54, that causes the displacement of the piston 58 (and cap member 60) away (to the left of the drawing, see FIG. 10), and thus the release of the filter discs battery 70 from the previous compact state is achieved, as a preparatory stage before their spin-cleaning.

Flushing water is admitted through the outlet port 20, freely entering the nozzled conduits 30*a*–30*c* (see FIG. 2) and discharged in inclined jet forms against the filter discs 70, to perform the spinning and rinsing operation. The discs are free to revolve about the edges of the three vanes 32*a*–32*c* (see FIG. 3) (although the option to support the discs directly by the nozzled conduits 30*a*–30*c* is also available).

Water does not reach the inner space of the skeleton-like core member, since the wall of the elastic funnel-shaped sleeve valve 90 becomes pressed against the cone-shaped valve-seat cavity walls 34, sealing thereby the water discharge slits S.

The rinsing stage operation is thus completed independent of the flushing, reverse flow pressure level, as far as the displacement of the cap member 60 is concerned—in distinction to the state of the art devices including those of our Patent.

It will be thus appreciated by those skilled in the art that the construction proposed according to the invention is advantageous in the relevant respect of production technology, number of parts and assembly costs, and maintenance requirements, mainly due to the unique structure of off-central location of the jet generating nozzled conduit(s) 30.

While the above description contains many specificities, these should not be construed as limitations on the scope of the invention, but rather as an exemplification of preferred embodiments. Those skilled in the art will envision other possible variations that are within its scope. Accordingly, the scope of the invention should be determined not by the embodiment illustrated, but by the appended claims and their legal equivalents.

Thus, for example even a single jet-generating nozzled conduit 30 may suffice, however, three, of course, present more symmetric and balanced construction. Furthermore, the spin-supporting function can be fulfilled by the nozzled conduits 30 properly, without the need to provide for the vanes 32 altogether.

What is claimed is:

1. A liquid filtering device, particularly for irrigation water installations of the type comprising:

a cylindrical housing with an inlet port and an outlet port;

a cylindrical filter member installed within the housing so that, water flowing from the inlet port to the outlet port enters the filter member in a radial direction, and is discharged through the outlet port, and vice-versa during reversed, filter flushing flow cycles;

a core member centrally mounted within the cylindrical space defined by the filter member, and integrally formed to include at least one tubular conduit extending off-centrally along an internal generatrix line of the filter member and provided with a series of nozzles for ejecting jets in the direction of the filter member during said reverse filter flushing flow cycles, a support for the filter member, and a fixed member abutting against the filter member at one axial side thereof;

a cylinder-and-piston assembly mounted to the core member, comprising a displaceable member abutting against the filter member at the other axial side thereof; and means for applying pressure to the assembly whereby the displaceable member becomes displaced away of the fixed member.

2. A liquid filtering device, particularly for irrigation water installations of the type comprising:

a cylindrical housing with an inlet port and an outlet port;

a cylindrical filter member installed within the housing so that, water flowing from the inlet port to the outlet port enters the filter member in a radial direction, and is discharged through the outlet port, and vice-versa during reversed, filter flushing flow cycles;

a core member centrally mounted within the cylindrical space defined by, and forming a support for, the filter member; a fixed member abutting against the filter member at one axial side thereof;

a piston assembly mounted to the core member, comprising a piston and a displaceable member coupled to the piston and abutting against the filter member at the other axial side thereof; and means for applying pressure to the assembly whereby the displaceable member becomes displaced away of the fixed member, and at least one tubular conduit extending off-centrally, along an internal generatrix line of the filter member, and provided with a series of nozzles for ejecting jets in the direction of the filter member during said reverse filter flushing flow cycles; wherein the core member is integrally formed and comprises a cavity that forms a cylinder for the piston of the piston assembly.

3. The device as in claim 2, wherein the core member is formed with an elongated tube communicating at one end thereof with the cavity and at the other end with the pressure applying means.

4. The device as claimed in claim 3, wherein the core member comprises a structure configured to freely support the filter member upon being released by the displaceable member.

5. A liquid filtering device, particularly for irrigation water installations of the type comprising:

a cylindrical housing with an inlet port and an outlet port;

a cylindrical filter member installed within the housing so that, water flowing from the inlet port to the outlet port enters the filter member in a radial direction, and is discharged through the outlet port, and vice-versa during reversed, filter flushing flow cycles;

a core member centrally mounted within the cylindrical space defined by, and forming a support for, the filter member; a fixed member abutting against the filter member at one axial side thereof;

a cylinder-and-piston assembly mounted to the core member, comprising a displaceable member abutting against the filter member at the other axial side thereof; and means for applying pressure to the assembly whereby the displaceable member becomes displaced away of the fixed member, wherein the core member is integrally formed and comprises at least one tubular conduit extending off-centrally, along an internal generatrix line of the filter member, and provided with a series of nozzles for ejecting jets in the direction of the filter member during said reverse filter flushing flow cycles; and wherein the core member is formed with a cone-shaped cavity provided with passages, the cavity forming a seat for a one-way valve, made of an elastic material, being funnel shaped to fit into the cavity and having a wall portion configured to elastically close against the passages, and cut-out portions exposing the openings of the conduits to communicate with the outlet port.

6. The device as claimed in claim 5, wherein the valve is provided with at least one axially extending leg, the core member being further formed with at least one recess configured to receive said leg for mounting the valve to the core member.

* * * * *

UNITED STATES PATENT AND TRADEMARK OFFICE
CERTIFICATE OF CORRECTION

PATENT NO. : 6,398,037 B1
DATED : June 4, 2002
INVENTOR(S) : Sadan et al.

It is certified that error appears in the above-identified patent and that said Letters Patent is hereby corrected as shown below:

<u>Title page,</u>
Item [73], please correct the name of the Assignee as follows: -- "AR-KAL" Plastics Products (1973) --

Signed and Sealed this

Third Day of December, 2002

JAMES E. ROGAN
*Director of the United States Patent and Trademark Office*